(12) United States Patent
Zhao et al.

(10) Patent No.: US 12,174,409 B2
(45) Date of Patent: Dec. 24, 2024

(54) BACKLIGHT MODULE AND DISPLAY DEVICE

(71) Applicants: MIANYANG HKC OPTOELECTRONICS TECHNOLOGY CO., LTD, Mianyang (CN); HKC CORPORATION LIMITED, Shenzhen (CN)

(72) Inventors: Junyi Zhao, Mianyang (CN); Abao Huang, Mianyang (CN); Baohong Kang, Mianyang (CN)

(73) Assignees: MIANYANG HKC OPTOELECTRONICS TECHNOLOGY CO., LTD, Mianyang (CN); HKC CORPORATION LIMITED, Shenzhen (CN)

(*) Notice: Subject to any disclaimer, the term of this patent is extended or adjusted under 35 U.S.C. 154(b) by 0 days.

(21) Appl. No.: 18/074,549

(22) Filed: Dec. 5, 2022

(65) Prior Publication Data
US 2023/0288627 A1   Sep. 14, 2023

(30) Foreign Application Priority Data
Mar. 11, 2022   (CN) .......................... 202210242625.3

(51) Int. Cl.
*F21V 8/00*   (2006.01)
(52) U.S. Cl.
CPC ......... *G02B 6/0031* (2013.01); *G02B 6/0016* (2013.01)

(58) Field of Classification Search
CPC ................. H01L 25/0753; H01L 33/54; H01L 2224/48137; H01L 33/60;
(Continued)

(56) References Cited

U.S. PATENT DOCUMENTS

2008/0205078 A1   8/2008   Karlicek et al.
2009/0201662 A1*  8/2009   Kim .................... H01L 25/0753
                                                        438/35
(Continued)

FOREIGN PATENT DOCUMENTS

CN   110061116 A   7/2019
CN   110133914 A   8/2019
(Continued)

OTHER PUBLICATIONS

Yang,Jinxin, the ISA written comments, Feb. 2023,CN.
Yang,Jinxin, the International Search Report, Feb. 2023,CN.

*Primary Examiner* — Fatima N Farokhrooz (57) ABSTRACT

A backlight module and a display device are disclosed. The backlight module includes a back plate, a first light source assembly, and a second light source assembly. The first light source assembly includes a first light plate and a plurality of first light beads. The second light source assembly includes a second light plate and a plurality of second light beads. An edge of the first light plate and an edge of the second light plate are adjacent to form a groove portion. The backlight module further includes at least one third light bead and a reflective layer which are arranged in the groove portion. The reflective layer is disposed on a bottom and/or a side wall of the groove portion, and reflects outwards the light irradiated into the gap between the first light plate and the second light plate.

13 Claims, 3 Drawing Sheets (58) Field of Classification Search
CPC ......... H01L 2224/48091; H01L 33/505; H01L 33/507; H01L 33/642
See application file for complete search history.

(56) References Cited

U.S. PATENT DOCUMENTS

| | | | |
|---|---|---|---|
| 2010/0068839 A1* | 3/2010 | Ray | H01L 21/30 257/E31.127 |
| 2011/0084612 A1* | 4/2011 | Ratcliffe | F21V 29/70 257/E33.059 |
| 2016/0185277 A1* | 6/2016 | Cho | H05B 45/00 362/249.01 |
| 2017/0196060 A1* | 7/2017 | Watanabe | H01L 33/54 |
| 2017/0211761 A1* | 7/2017 | Kuriki | F21V 29/89 |
| 2020/0163233 A1 | 5/2020 | Brackley et al. | |

FOREIGN PATENT DOCUMENTS

| | | | | |
|---|---|---|---|---|
| CN | 210223358 U | | 3/2020 | |
| CN | 210605276 U | | 5/2020 | |
| CN | 111915982 A | | 11/2020 | |
| CN | 112002217 A | | 11/2020 | |
| CN | 112863390 A | | 5/2021 | |
| CN | 213517821 U | | 6/2021 | |
| CN | 113589581 A | | 11/2021 | |
| CN | 113990211 A | | 1/2022 | |
| CN | 114141163 A | | 3/2022 | |
| CN | 114527599 A | * | 5/2022 | |
| CN | 114677917 A | | 6/2022 | |
| EP | 1387412 A1 | * | 2/2004 | ............. H01L 24/97 |
| JP | 2011090903 A | * | 5/2011 | ......... F21S 48/1154 |
| TW | 201322480 A | * | 6/2013 | ............. H01L 33/60 |

\* cited by examiner

BACKLIGHT MODULE AND DISPLAY DEVICE

CROSS-REFERENCE TO RELATED APPLICATIONS

This application claims the priority and benefit of Chinese patent application 2022102426253, titled "Backlight Module and Display Device" and filed Mar. 11, 2022, with China National Intellectual Property Administration, the entire contents of which are incorporated herein by reference.

TECHNICAL FIELD

The present application relates to the field of display technology, and in particular, to a backlight module and a display device.

BACKGROUND

The description provided in this section is intended for the mere purpose of providing background information related to the present application but doesn't necessarily constitute prior art.

In the display field, Mini-LED is an LED chip with a chip size of about 100 μm×100 μm. It has the advantages of high color saturation, local dimming, high brightness, and energy saving, and so is widely used in backlight displays.

There are many LEDs on the Mini-LED light plate (usually thousands or even tens of thousands). For the time being, Mini-LED light plates are mostly small-sized light plates. When making a large-size light plate, one needs to assemble the small light plates together, so that there is generally a gap between the light plates. When the light emitted by the Mini-LEDs on the light plate hits the gap, it cannot be reflected back, resulting in image quality problems such as dark lines, which deteriorates the optical effect.

SUMMARY

It is therefore a purpose of the present application to provide a backlight module and a display device to avoid dark lines in the gap between the light plates, increasing the brightness at the gap between two adjacent light plates thereby improving the optical effect.

The present application discloses a backlight module. The backlight module includes a back plate, a first light source assembly and a second light source assembly. The first light source assembly includes a first light plate and a plurality of first light beads. The first light plate is arranged on the back plate, and the plurality of first light beads are arranged on the first light plate. The second light source assembly includes a second light plate and a plurality of second light beads. The second light plate and the first light plate are arranged on the back plate side by side. The plurality of second light beads are arranged on the second light plate. The edge of the first light plate and the edge of the second light plate are adjacent to form a groove portion. The backlight module further includes at least one third light bead and a reflective layer. The third light bead and the reflective layer are arranged in the groove portion. The reflective layer is disposed on the bottom and/or the side wall of the groove portion, and reflects the light irradiated into the gap between the first light plate and the second light plate.

Optionally, the first light plate includes a first main body portion and a first edge portion that are connected. The bottoms of the first main body portion and the first edge portion are flush. The top of the first main body portion is higher than the top of the first edge portion. The second light plate has a quadrate structure. The side of the first main body portion adjacent to the first edge portion, the first edge portion, and the side of the second light plate adjacent to the first edge portion jointly form the groove portion. The third light bead is arranged on the first edge portion. The reflective layer is at least partially disposed on the side of the first main body portion adjacent to the first edge portion.

Optionally, the first light plate includes a first main body portion and a first edge portion that are connected. The bottoms of the first main body portion and the first edge portion are flush. The top of the first main body portion is higher than the top of the first edge portion. The second light plate includes a second main body portion and a second edge portion that are connected. The bottoms of the second main body portion and the second edge portion are flush. The top of the second main body portion is higher than the top of the second edge portion. The side of the first main body portion adjacent to the first edge portion, the first edge portion, the second edge portion, and the side of the second main body portion adjacent to the second edge portion jointly form the groove portion. The third light bead is arranged on the first edge portion and/or the second edge portion. The reflective layer is at least partially disposed on the side of the first main body portion adjacent to the first edge portion, and on the side of the second main body portion adjacent to the second edge portion.

Optionally, the side of the first main body portion adjacent to the first edge portion forms a continuous arc shape with the top of the first edge portion, and the second edge portion forms a continuous arc shape with the side of the second main body portion adjacent to the second edge portion.

Optionally, the reflective layer is further disposed on the first edge portion and the second edge portion, and does not overlap the third light bead.

Optionally, the first light plate includes a first main body portion and a first edge portion that are connected. The bottoms of the first main body portion and the first edge portion are flush. The thickness of the first edge portion is less than half of the thickness of the first main body portion. The second light plate includes a second main body portion and a second edge portion that are connected. The bottom of the second edge portion is abutted with the top of the first edge portion. The thickness of the second edge portion is less than half of the thickness of the second main body portion. The side of the first main body portion adjacent to the second edge portion, the second edge portion, and the side of the second main body portion adjacent to the second edge portion jointly form the groove portion. The third light bead is arranged on the second edge portion. The reflective layer is at least partially disposed on the side of the second main body portion adjacent to the second edge portion, and on the side of the first main body portion adjacent to the second edge portion.

Optionally, the thickness of the first edge portion is one third of the thickness of the first main body portion, and the thickness of the second edge portion is one third of the thickness of the second main body portion.

Optionally, the first main body portion includes a plurality of first lamp grooves corresponding to the shape of the groove portion. The first light bead is installed corresponding to the first lamp groove, and the first lamp groove is also provided with a reflective film that does not overlap the first light bead. The second main body portion includes a plurality of second lamp grooves corresponding to the shape of the groove portion. The second light bead is installed correspondingly to the second lamp groove, and a reflective film that does not overlap the second light bead is further arranged in the second lamp groove.

Optionally, a plurality of the third light beads are arranged in the groove portion, and along the length direction of the gap between the first light plate and the second light plate, the plurality of third light beads are arranged at intervals in sequence.

The present application further discloses a display device, which includes the above-mentioned backlight module, and a display panel corresponding to the backlight module, where the backlight module provides a backlight source for the display panel.

In the present application, a groove portion with a lower height is formed on the edges of the adjacent light plates, and a third light bead and a reflective layer are arranged in the groove portion, which not only improves the brightness of the edges of the light plates through the third light bead located at the edges of the light plates, but also uses the reflective layer to reflect the light emitted by the third light bead into the gap between the first light plate and the second light plate, and reflect the light irradiated into the gap, so that the gap between the light plates emits light, and the brightness of the gap between adjacent light plates in the backlight module is increased, thereby solving the problem of dark lines at the gap of the light plates, improving the optical effect.

BRIEF DESCRIPTION OF DRAWINGS

The accompanying drawings, which are included to provide a further understanding of the embodiments of the present application, constitute a part of the specification, are used to illustrate the embodiments of the present application, and together with the written description, serve to explain the principles of the present application. Obviously, the drawings used in the following description merely depict some embodiments of the present application, and for those having ordinary skill in the art, other drawings can also be obtained from these drawings without investing creative effort. In the drawings.

DETAILED DESCRIPTION OF EMBODIMENTS

It should be understood that the terminology used herein, the specific structural and functional details disclosed are intended for the mere purpose of describing specific embodiments and are representative, but the present application may be embodied in many alternative forms and should not be construed as limited only the embodiments set forth herein.

The present application will be described in detail below with reference to the accompanying drawings and optional embodiments.

Figure 1:
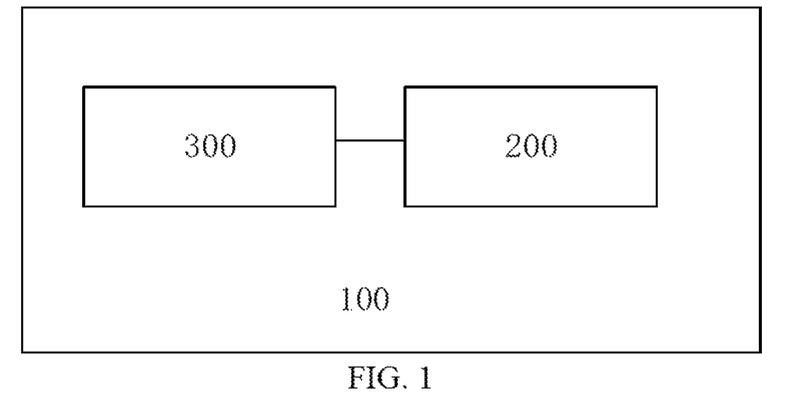
FIG. 1 is a schematic diagram of a display device provided by the present application.

As shown in FIG. 1, the present application discloses a display device 100. The display device 100 includes a display panel 300 and a backlight module 200. The display panel 300 is located on the light-emitting side of the backlight module 200. The backlight module 200 provides a backlight source for the display panel 300. As shown in FIGS. 2-7, the backlight module 200 includes a back plate 210, a first light source assembly 220 and a second light source assembly 230. The first light source assembly 220 includes a first light plate 221 and a plurality of first light beads 222. The first light plate 221 is arranged on the back plate 210, and the plurality of first light beads 222 are arranged on the first light plate 221. The second light source assembly 230 includes a second light plate 231 and a plurality of second light beads 232. The second light plate 231 and the first light plate 221 are arranged on the back plate 210 in parallel or side by side. The plurality of second light beads 232 are arranged on the second light plate 231. The edge of the first light plate 221 and the edge of the second light plate 231 are adjacent to define a groove portion 240. The bottom of the first light plate 221, the bottom of the groove portion 240 and the bottom of the second light plate 231 are flush. The top of the groove portion 240 is lower than the top of the first light plate 221, and also lower than the top of the second light plate 231. The backlight module 200 further includes at least one third light bead 250 and a reflective layer 260. The third light bead 250 and the reflective layer 260 are arranged in the groove portion 240. The reflective layer 260 is disposed on the bottom and/or sidewall of the groove portion 240 to reflect the light irradiated into the gap between the first light plate 221 and the second light plate 231.

Compared with a solution that only adds a reflective sheet at the gap between the light plates to solve the problem of dark lines in the gap, in the present application a groove portion 240 with a lower height is formed on the edges of the adjacent light plates, and the third light bead 250 and the reflective layer 260 are arranged in the groove portion 240, which not only improves the brightness of the edges of the light plates through the third light beads 250 located at the edges of the light plates thus making the brightness at the edges of the light plates greater, so that it can cover the dark band at the gap of the light plates to a certain extent, but also uses the reflective layer 260 to reflect the light emitted by the third light beads 250 into the gap between the first light plate 221 and the second light plate 231, and reflect the light irradiated into the gap, so that the gap between the light plates is able to emit light, so that the brightness at the gap between the adjacent light plates in the backlight module 200 increases. In addition, the combination of the profile of the groove portion 240 together with the third light beads 250 and the reflective layer 260 enables the position of the groove portion 240 to simultaneously have the functions of self-illumination, focusing and reflecting light, thereby better solving the problem of dark lines in the gap between the light plates and improving the utilization rate of light and optical effects.

The backlight module 200 may be a general direct-lit type backlight module 200, a mini-LED backlight module 200, or a Micro LED backlight module 200. In terms of the specific design of the backlight module 200, the present application provides the following specific embodiments.

Embodiment 1

Figure 2:
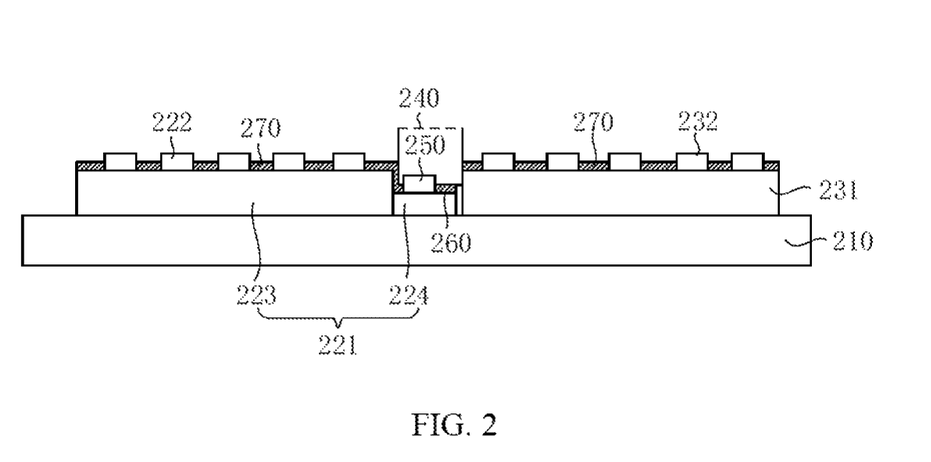
FIG. 2 is a schematic cross-sectional view of a backlight module provided by a first embodiment of the present application.

As shown in FIG. 2, as a schematic cross-sectional view of a backlight module provided by the first embodiment of the present application, the first light plate 221 includes a first main body portion 223 and a first edge portion 224. The bottoms of the first main body portion 223 and the first edge portion 224 are flush. The top of the first main body portion 223 is higher than the top of the first edge portion 224. The second light plate 231 is a quadrate structure (substantially square or rectangular). The side of the first main body portion 223 adjacent to the first edge portion 224, the first edge portion 224, and the side of the second light plate 231 adjacent to the first edge portion 224 jointly form the groove portion 240. The third light bead 250 is arranged on the first edge portion 224. The reflective layer 260 is at least partially disposed on a side of the first main body portion 223 adjacent to the first edge portion 224.

In this embodiment, the edge shapes of the first light plate 221 and the second light plate 231 are different. In this case, the first edge portion 224 serves as the bottom of the groove portion 240, and the side surface of the first main body portion 223 and the side surface of the second main body portion 233 serve as side walls of the groove portion 240. When the light plates thermally expand and contract, even if the first light plate 221 and the second light plate 231 expand to increase their volumes, only the first edge portion 224 is in contact with the second light plate 231. Compared with the solution in the related art in which two identical light plates are directly abutted against each other, the contact area between the first light plate 221 and the second light plate 231 in this embodiment is smaller, the area of pushing is smaller, and the problem of cracking is not easy to occur. In addition, when there are second light plates 231 on both sides of the first light plate 221, the cross section of the first light plate 221 is of the shape of an inverse letter T.

Further, in the first light plate 221, the reflective layer 260 is not only disposed on the side of the first main body portion 223 adjacent to the first edge portion 224, but is also disposed on the first edge portion 224, and does not overlap the third light bead 250, and the light irradiated by the third light bead 250 on the first edge portion 224 is also reflected, thereby improving the utilization rate of light. When making the reflective layer 260, a reflective material coating or a reflective sheet is directly deposited on the entire first light plate 221, and avoid overlapping the first light bead 222 and the third light bead 250. The reflective structure deposited on the first main body portion 223 forms a reflective film 270, and the brightness of the corresponding region of the first main body portion 223 can be improved by the reflective film 270. The reflective structure deposited on the first edge portion 224 forms a reflective layer 260, which improves the brightness of the region corresponding to the first edge portion 224 and improves the problem of dark lines in the gap between the light plates.

Figure 3:
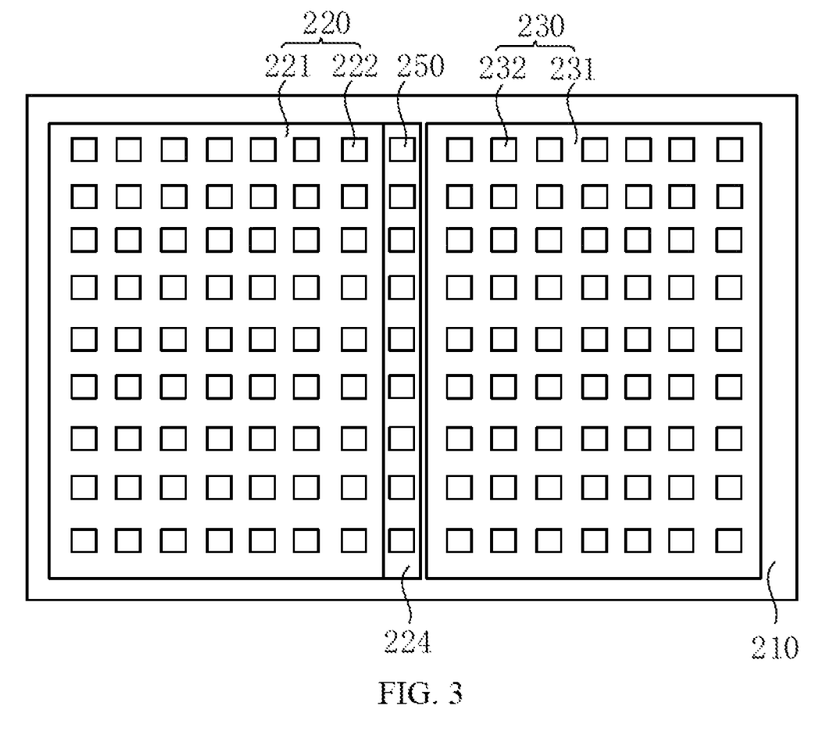
FIG. 3 is a schematic plan view of a backlight module provided by the first embodiment of the present application.

On the first main body portion 223, a plurality of first light beads 222 are arranged in an array. On the second light plate 231, a plurality of second light beads 232 are arranged in an array. For the third light beads 250 in the groove portion 240, as shown in FIG. 3, the groove portion 240 is provided with a plurality of the third light beads 250. Along the length direction of the gap between the first light plate 221 and the second light plate 231, a plurality of the third light beads 250 are arranged at intervals in sequence and correspond to the arrangement of the first light beads 221 and the second light beads 231. Specifically, along the length direction of the gap between the first light plate 221 and the second light plate 231, the distance between two adjacent third lamp beads 250 may be equal to that between two adjacent first lamp beads 250, and also equal to the distance between the two adjacent second lamp beads 232. Further, the distance between the third lamp bead 250 and the adjacent first lamp bead 222 may be equal to the distance between the third lamp bead 250 and the adjacent second lamp bead 232, so as to further improve the uniformity of light output of the backlight module 200.

Embodiment 2

Figure 4:
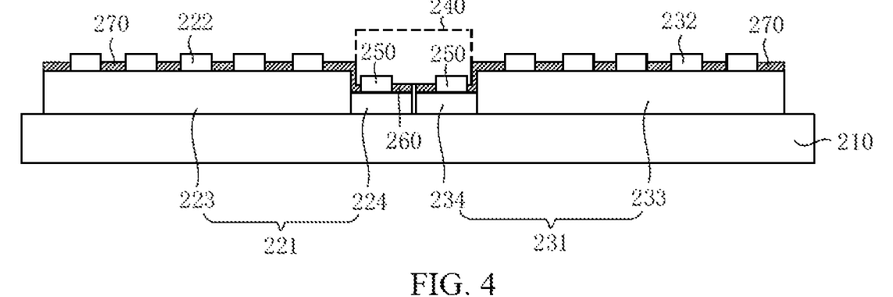
FIG. 4 is a schematic cross-sectional view of a backlight module provided by a second embodiment of the present application.

As shown in FIG. 4, as a schematic cross-sectional view of a backlight module provided by the second embodiment of the present application, the difference from the first embodiment is that the shapes of the first light plate 221 and the second light plate 231 in this embodiment are the same. That is, the first light plate 221 includes a first main body portion 223 and a first edge portion 224 that are connected. The bottoms of the first main body portion 223 and the first edge portion 224 are flush, and the top of the first main body portion 223 is higher than the top of the first edge portion 224. The second light plate 231 includes a second main body portion 233 and a second edge portion 234 that are connected. The bottoms of the second main body portion 233 and the second edge portion 234 are flush, and the top of the second main body portion 233 is higher than the top of the second edge portion 234. The side of the first main body portion 223 adjacent to the first edge portion 224, the first edge portion 224, the second edge portion 234, and the side of the second main body portion 233 adjacent to the second edge portion 234 jointly constitute the groove portion 240. The third light beads 250 are disposed on the first edge portion 224 and/or the second edge portion 234. The reflective layer 260 is at least partially disposed on the side of the first main body portion 223 adjacent to the first edge portion 224 and the side of the second main body portion 233 adjacent to the second edge portion 234.

In this embodiment, when the number of light plates in the backlight module 200 is large, the cross-sectional shape of each of the first light plate 221 and the second light plate 231 is that of an inverse letter "T". Compared with the first embodiment, the shapes of the two light plates in this embodiment are identical. In this case, the first main body portion 223, the first edge portion 224, the second main body portion 233, and the second edge portion 234 are all quadrate structures. With such a design, first of all, the production of the light plates is more convenient. Secondly, for the assembler, the assembly process is also more convenient, and there is no need to consider the positions and fitting of light plates of different shapes. In this embodiment, the bottom of the groove portion 240 is composed of the first edge portion 224 and the second edge portion 234. Therefore, the bottom area of the groove portion 240 is larger, more third light beads 250 are accommodated, and the area of the reflective layer 260 is also larger, so that the reflection effect is better, which is beneficial to further improve the brightness at the gap between the light plates. Furthermore, the third light beads 250 and the reflective layer 260 are arranged at equal intervals on both sides of the gap between the light plates, so that the brightness of the light irradiated and reflected to the gap between the light plates is equal, and so the uniformity of the light emitted by the gap between the light plates and by the overall groove portion 240 is relatively better.

Of course, in this embodiment, the reflective films 270 located on the first main body portion 223 and the second main body portion 233 and the reflective layer 260 located on the first edge portion 224 and the second edge portion 234 can use the same design as in the first embodiment to further improve the utilization rate of light.

Embodiment 3

Figure 5:
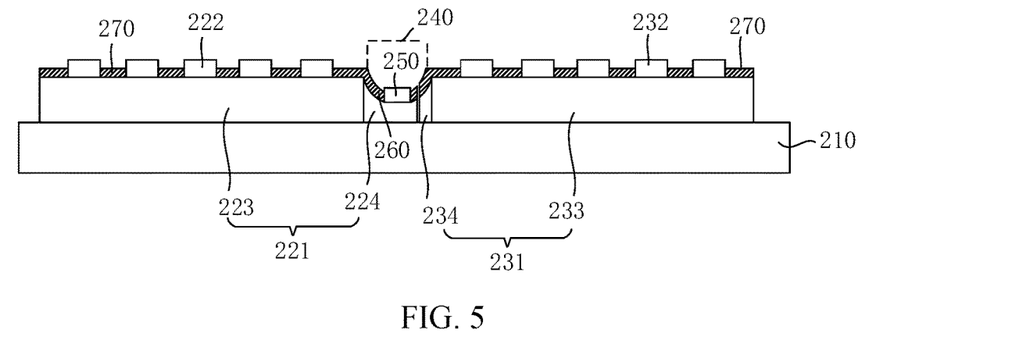
FIG. 5 is a schematic cross-sectional view of the first backlight module provided by a third embodiment of the present application.

As shown in FIG. 5, as a schematic cross-sectional view of a backlight module provided in the third embodiment of the present application, the difference from the second embodiment is that in the second embodiment, the cross-sectional shapes of the first main body portion 223, the second main body portion 233, the first edge portion 224 and the second edge portion 234 are all quadrate, and the cross-sectional shape of the first groove portion 240 is also quadrate, while in this embodiment, the side of the first main body portion 223 adjacent to the first edge portion 224 jointly forms a continuous arc shape with the top of the first edge portion 224, and the second edge portion 234 jointly forms a continuous arc shape with the side of the second main body portion 233 adjacent to the second edge portion 234.

In this case, the reflective layer 260 arranged on the side of the first main body portion 223 adjacent to the first edge portion 224, the reflective layer 260 arranged on the side of the second main body portion 233 adjacent to the second edge portion 234, and the reflective layers 260 arranged on the first edge portion 224 and the second edge portion 234 and not overlapping the third light bead 250 are all arc-shaped, and the arcs are all protruding away from the assembling gap. In this way, all the reflective layers 260 in the groove portion 240 form a concave mirror structure, and based on the principle of light divergence of the concave mirror, the groove portion 240 as a whole emits uniform light.

Figure 6:
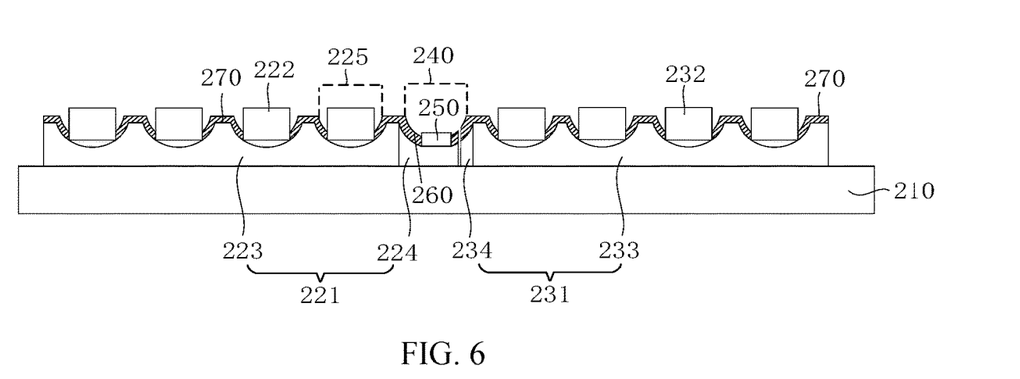
FIG. 6 is a schematic cross-sectional view of a second backlight module provided by the third embodiment of the present application.

Further, as shown in FIG. 6, the first main body portion 223 includes a plurality of first lamp grooves 225 corresponding to the shape of the groove portion 240. The first light bead 222 is installed corresponding to the first lamp groove 225, and the first lamp groove 225 is further provided with a reflective film 270 which does not overlap the first light bead 222. The second main body portion 233 includes a plurality of second lamp grooves 235 corresponding to the shape of the groove portion 240. The second light bead 232 is installed corresponding to the second lamp groove 235, and the second lamp groove 235 is further provided with a reflective film 270 that does not overlap the second light bead 232. In this case, after all the light plates on the backlight module 200 are assembled, the entire surface of the light plates will form an array of identical groove structures. Through the groove structures, the corresponding light beads emit uniform light, so that the overall light emission of the backlight module 200 is uniform. Of course, in other embodiments, the first light plate 221 under the first light bead 222 and the second light plate 231 under the second light bead 232 can also adopt the lamp groove structures in this embodiment, which can also improve the overall uniformity of light emission of the backlight module 200.

As an optional implementation, the groove portion 240, the first lamp groove 225, and the second lamp groove 235 are all arc-shaped grooves. The width and depth of the groove portion 240 are respectively equal to the width and depth of the first lamp groove 225, and are also respectively equal to the width and depth of the second lamp groove 235. Correspondingly, in the first embodiment and the second embodiment, as an optional implementation, the groove portion 240, the first lamp groove 225 and the second lamp groove 235 are all quadrate grooves. The width and depth of the groove portion 240 are respectively equal to the width and depth of the first lamp groove 225, and are also respectively equal to the width and depth of the second lamp groove 235. Adopting such a design facilitates the processing of the first lamp panel 221 and the second lamp panel 231, and also helps to improve the uniformity of light output of the backlight module 200.

Embodiment 4

Figure 7:
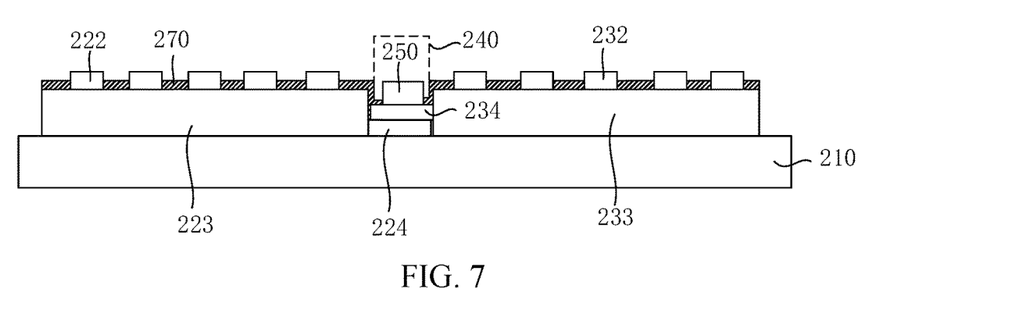
FIG. 7 is a schematic cross-sectional view of a backlight module provided by a fourth embodiment of the present application.

As shown in FIG. 7, as a schematic cross-sectional view of a backlight module provided in the fourth embodiment of the present application, the difference from the first embodiment is that in addition to the first edge portion 224 of the first light plate 221, the second light plate 231 also has a second edge portion 234, and the first edge portion 224 and the second edge portion 234 are interdigitated. Specifically, the first light plate 221 includes a first main body portion 223 and a first edge portion 224 that are interconnected. The bottoms of the first main body portion 223 and the first edge portion 224 are flush. The thickness of the first edge portion 224 is less than half of the thickness of the first main body portion 223. The second light plate 231 includes a second main body portion 233 and a second edge portion 234 that are connected. The bottom of the second edge portion 234 and the top of the first edge portion 224 are abutted. The thickness of the second edge portion 234 is less than half of the thickness of the second main body portion 233. The side of the first main body portion 223 adjacent to the second edge portion 234, the second edge portion 234, and the side of the second main body portion 233 adjacent to the second edge portion 234 jointly constitute the groove portion 240. The third light bead 250 is arranged on the second edge portion 234. The reflective layer 260 is at least partially disposed on the side of the second main body portion 233 adjacent to the second edge portion 234 and on the a side of the first main body portion 223 adjacent to the second edge portion 234.

In this embodiment, through the staggered arrangement of the first edge portion 224 and the second edge portion 234, the gap between the first light plate 221 and the second light plate 231 is transferred to between the second edge portion 234 and the second main body portion 233, so that the depth of the gap between the light plates becomes shallower, which is beneficial for the light to irradiate in, thereby helping to improve the problem of dark lines in the gap between the light plates. In addition, when assembling the light plates, first install the first light plates 221 on the back plate 210, and then install the second light plate 231 between two adjacent first light plates 221, so that the second edge portion 234 of the second light plate 231 is attached to the first edge portion 224 of the first light plate 221. In this way, the first light plates 221 can also play a positional alignment effect on the second light plates 231, which facilitates the installation of the light plates.

Further, the thickness of the first edge portion 224 is one third of the thickness of the first main body portion 223, and the thickness of the second edge portion 234 is one third of the thickness of the second main body portion 233. At this time, the distance from the bottom of the third light bead 250 to the back plate 210 is two-thirds of the thickness of the first main body portion 223, and the top of the third light bead 250 is closer to be on the same plane as the top of the first light bead 222 and the top of the second light bead 232, which is beneficial to improve the overall light emitting effect of the backlight module 200.

It should be noted that the inventive concept of the present application can form a large number of embodiments, but they cannot be enumerated because the length of the application document is limited. The technical features as set forth herein can be arbitrarily combined to form a new embodiment, and the original technical effects may be enhanced after various embodiments or technical features are combined.

The foregoing is a further detailed description of the present application in conjunction with specific optional embodiments, but it should not be construed as that the specific implementation of the present application will be limited to these descriptions. For those having ordinary skill in the technical field of the present application, without departing from the scope and spirit of the present application, some simple deductions or substitutions can be made, which should all be regarded as falling in the scope of protection of the present application.

What is claimed is:

1. A backlight module, comprising:
a back plate;
a first light source assembly, comprising a first light plate and a plurality of first light-emitting diodes, wherein the first light plate is arranged on the back plate, and the plurality of first light-emitting diodes are arranged on the first light plate; and
a second light source assembly, comprising a second light plate and a plurality of second light-emitting diodes, wherein the second light plate and the first light plate are arranged side by side on the back plate, and wherein the plurality of second light-emitting diodes are arranged on the second light plate;
wherein an edge of the first light plate and an edge of the second light plate are adjacent to form a groove portion, wherein there is defined a gap between the first light plate and the second light plate; wherein the first light plate and the second light plate are separate light plates and are each an independent light plate; wherein the first light plate and the second light plate each have a substantially flat upper surface, and wherein the upper surfaces of the first light plate and the second light plate are flush with each other; wherein the first light plate and the second light plate are of substantially a same size, wherein the first light plate and the second light plate are arranged side by side on the backplate such that the edge of the first light plate is arranged in proximity to the corresponding edge of the second light plate; wherein the backlight module further comprises at least one third light-emitting diode and a reflective layer, wherein the third light-emitting diode and the reflective layer are arranged in the groove portion, wherein the reflective layer is disposed on a bottom and a side wall of the groove portion, and is operative to reflect outwards the light irradiated into a gap between the first light plate and the second light plate;
wherein the first light plate comprises a first main body portion and a first side base that are connected, wherein bottoms of the first main body portion and the first side base are flush, and wherein a top of the first main body portion is higher than a top of the first side base;
wherein the second light plate comprises a second main body portion and a second side base that are connected, wherein bottoms of the second main body portion and the second side base are flush, and wherein a top of the second main body portion is higher than a top of the second side base;
wherein a side of the first side base facing away from the first main body portion abuts against a side of the second side base facing away from the second main body portion, and wherein an upper surface of the first side base is flush with an upper surface of the second side base; wherein a side of the first main body portion adjacent to the first side base, the first side base, the second side base, and a side of the second main body portion adjacent to the second side base jointly form the groove portion;
wherein the third light-emitting diode is disposed on each of the first side base and the second side base, and wherein the reflective layer is disposed on the side of the first main body portion adjacent to the first side base, and on the side of the second main body portion adjacent to the second side base;
wherein the reflective layer is further disposed on the first side base and the second side base, wherein an orthogonal projection of the reflective layer on the first side base and the second base does not overlap an orthogonal projection of the third light-emitting diode on the first side base and the second side base;
wherein the reflective layer is disposed on the bottom and the side walls of the groove portion to fully cover an inner surface of the groove portion without covering the third light-emitting diodes disposed on the first side base and the second side base in the groove portion.

2. The backlight module of claim 1, wherein the first light plate has an identical shape with that of the second plate.

3. The backlight module of claim 1, wherein the side of the first main body portion adjacent to the first side base forms a continuous arc shape with the top of the first side base, and wherein the second side base forms a continuous arc shape with the side of the second main body portion adjacent to the second side base.

4. The backlight module of claim 1, wherein the at least one third light-emitting diode comprises a plurality of third light-emitting diodes that are arranged in the groove portion, and wherein along a length of the gap between the first light plate and the second light plate, the plurality of third light-emitting diodes are arranged at intervals in sequence.

5. The backlight module of claim 1, wherein the reflective layer is a flat sheet that has a less height than that of the at least one third light-emitting diode, and wherein the at least one third light-emitting diode has a less height than a depth of the groove portion.

6. The backlight module of claim 2, wherein the first main body portion, the first side base, the second main body portion, and the second side base are each of a quadrate structure.

7. The backlight module of claim 6, wherein the first main body portion comprises a plurality of first lamp grooves corresponding to a shape of the groove portion, wherein the first light-emitting diodes are installed corresponding to the first lamp grooves, and wherein a reflective film is disposed in each first lamp groove and does not overlap the respective first light-emitting diode;
wherein the second main body portion comprises a plurality of second lamp grooves corresponding to a shape of the groove portion, wherein the second light-emitting diodes are installed corresponding to the second lamp grooves, and wherein a reflective film is disposed in each second lamp groove and does not overlap the respective second light-emitting diode;

wherein the groove portion, the first lamp grooves, and the second lamp grooves are all quadrate grooves, and wherein a width and a depth of the groove portion are respectively equal to a width and a depth of each of the first lamp grooves and are respectively equal to a width and a depth of each of the second lamp grooves.

8. The backlight module of claim 3, wherein the first main body portion comprises a plurality of first lamp grooves corresponding to a shape of the groove portion, wherein the first light-emitting diodes are installed corresponding to the first lamp grooves, and wherein a reflective film is disposed in each first lamp groove and does not overlap the respective first light-emitting diode;

wherein the second main body portion comprises a plurality of second lamp grooves corresponding to a shape of the groove portion, wherein the second light-emitting diodes are installed corresponding to the second lamp grooves, and wherein a reflective film is disposed in each second lamp groove and does not overlap the respective second light-emitting diode;

wherein the groove portion, the first lamp grooves, and the second lamp grooves are all quadrate grooves, and wherein a width and a depth of the groove portion are respectively equal to a width and a depth of each of the first lamp grooves and are respectively equal to a width and a depth of each of the second lamp grooves.

9. The backlight module of claim 4, wherein along a length of the gap between the first light plate and the second light plate, a distance between every two adjacent third light-emitting diodes is equal to a distance between every two adjacent first light-emitting diodes, and is also equal to a distance between every two adjacent second light-emitting diodes.

10. The backlight module of claim 4, wherein a distance between each third light-emitting diode and the first light-emitting diode adjacent to the third light-emitting diode is equal to a distance between the third light-emitting diode and the second light-emitting diode adjacent to the third light-emitting diode.

11. A backlight module, comprising:
a back plate;
a first light source assembly, comprising a first light plate and a plurality of first light-emitting diodes, wherein the first light plate is arranged on the back plate, and the plurality of first light-emitting diodes are arranged on the first light plate; and
a second light source assembly, comprising a second light plate and a plurality of second light-emitting diodes, wherein the second light plate and the first light plate are arranged side by side on the back plate, and wherein the plurality of second light-emitting diodes are arranged on the second light plate;
wherein the first light plate comprises a first main body portion and a first side base that are connected, wherein bottoms of the first main body portion and the first side base are flush, and wherein a top of the first main body portion is higher than a top of the first side base; wherein the side of the first main body portion adjacent to the first side base forms a continuous arc shape with the top of the first side base;
wherein the second light plate comprises a second main body portion and a second side base that are connected, wherein bottoms of the second main body portion and the second side base are flush, and wherein a top of the second main body portion is higher than a top of the second side base; wherein the second side base forms a continuous arc shape with the side of the second main body portion adjacent to the second side base; wherein the first light plate and the second light plate are separate light plates and are each an independent light plate; wherein the first light plate and the second light plate each have a substantially flat upper surface, and wherein the upper surfaces of the first light plate and the second light plate are flush with each other; wherein the first light plate and the second light plate are of substantially a same size, wherein the first light plate and the second light plate are arranged side by side on the backplate such that the edge of the first light plate is arranged in proximity to the corresponding edge of the second light plate, wherein there is defined a gap between the first light plate and the second light plate;

wherein a side of the first main body portion adjacent to the first side base, the first side base, the second side base, and a side of the second main body portion adjacent to the second side base jointly form the groove portion;

wherein the backlight module further comprises a plurality of third light-emitting diodes and a reflective layer that are disposed in the groove portion; wherein the reflective layer is disposed on a bottom and a sidewall of the groove portion and is operative to reflect outwards the light irradiated into a gap between the first light plate and the second light plate, wherein the plurality of third light-emitting diodes are disposed on the bottom of the groove, and wherein an orthogonal projection of the reflective layer on the bottom of the groove does not overlap an orthogonal projection of the plurality of third light-emitting diodes on the bottom of the groove;

wherein the reflective layer is disposed in the groove portion to fully cover an inner surface of the groove portion without covering the third light-emitting diodes disposed in the groove portion.

12. A backlight module, comprising:
a back plate;
a first light source assembly, comprising a first light plate and a plurality of first light-emitting diodes, wherein the first light plate is arranged on the back plate, and the plurality of first light-emitting diodes are arranged on the first light plate; and
a second light source assembly, comprising a second light plate and a plurality of second light-emitting diodes, wherein the second light plate and the first light plate are arranged side by side on the back plate, and wherein the plurality of second light-emitting diodes are arranged on the second light plate;
wherein an edge of the first light plate and an edge of the second light plate are adjacent to form a groove portion; wherein the first light plate and the second light plate are separate light plates and are each an independent light plate; wherein the first light plate and the second light plate each have a substantially flat upper surface, and wherein the upper surfaces of the first light plate and the second light plate are flush with each other; wherein the first light plate and the second light plate are of substantially a same size, wherein the first light plate and the second light plate are arranged side by side on the backplate such that the edge of the first light plate is arranged in proximity to the corresponding edge of the second light plate; wherein the backlight module further comprises at least one third light-emitting diode and a reflective layer, wherein the third light-emitting diode and the reflective layer are arranged in the groove portion, wherein the reflective layer is disposed on a bottom and a side wall of the groove portion, and is operative to reflect outwards the light irradiated into a gap between the first light plate and the second light plate;

wherein the first light plate comprises a first main body portion and a first side base that are connected, wherein bottoms of the first main body portion and the first side base are flush, and wherein a top of the first main body portion is higher than a top of the first side base, wherein a thickness of the first side base is less than half of a thickness of the first main body portion;

wherein the second light plate comprises a second main body portion and a second side base that are connected, wherein a bottom surface of the second side base abuts on a top surface of the first side base; wherein a top of the second main body portion is higher than a top of the second side base, and wherein a thickness of the second side base is less than half of a thickness of the second main body portion;

wherein a side of the first main body portion adjacent to the first side base, the second side base, and a side of the second main body portion adjacent to the second side base jointly form the groove portion;

wherein the third light-emitting diode is disposed on the second side base, and wherein the reflective layer is disposed on the side of the first main body portion adjacent to the first side base, and on the side of the second main body portion adjacent to the second side base;

wherein the reflective layer is disposed on the bottom and the side walls of the groove portion to fully cover an inner surface of the groove portion without covering the third light-emitting diode disposed on the second side base in the groove portion.

13. The backlight module as recited in claim 12, wherein the thickness of the first side base is one third of the thickness of the first main body portion, and wherein the thickness of the second side base is one third of the thickness of the second main body portion.

\* \* \* \* \*